United States Patent

Schöpwinkel et al.

[11] Patent Number: 5,804,639
[45] Date of Patent: Sep. 8, 1998

[54] PIGMENT PREPARATIONS HAVING A HIGH SOLIDS CONTENT

[75] Inventors: Gert Schöpwinkel, Neunkirchen-Seelscheid; Kai Bütje, Duisburg; Günter Wieghaus, Krefeld; Richard Bäthke, Duisburg; Torsten Groth, Odenthal; Winfried Joentgen, Köln, all of Germany

[73] Assignee: Bayer AG, Leverkusen, Germany

[21] Appl. No.: 735,089

[22] Filed: Oct. 22, 1996

[30] Foreign Application Priority Data

Oct. 31, 1995 [DE] Germany .......................... 19540557.9

[51] Int. Cl.⁶ ................................. C08J 3/04; C08K 3/22
[52] U.S. Cl. .......................... 524/497; 524/501; 524/522; 524/523; 528/328; 528/363; 528/480; 528/499
[58] Field of Search ..................... 528/328, 363, 528/480, 499; 525/418, 419; 524/497, 501, 522, 523

[56] References Cited

U.S. PATENT DOCUMENTS

| | | | |
|---|---|---|---|
| 4,839,461 | 6/1989 | Boehmke | 528/363 |
| 5,288,783 | 2/1994 | Wood | 525/418 |
| 5,296,578 | 3/1994 | Koskan et al. | 528/363 |
| 5,393,868 | 2/1995 | Freeman et al. | 528/480 |
| 5,548,868 | 8/1996 | Kroner et al. | 525/419 |

FOREIGN PATENT DOCUMENTS

| | | |
|---|---|---|
| 42 21 875 | 1/1994 | Germany . |
| 43 07 114 | 9/1994 | Germany . |
| 1 404 814 | 9/1975 | United Kingdom . |
| WO 92/15535 | 9/1992 | WIPO . |

OTHER PUBLICATIONS

Orbit Abstract of DE 42 21 875 (Jan. 5, 1994).

Orbit Abstract of DE 43 07 114 (Sep. 8, 1994).

Kovacs et al., *Chemical Studies of Polyaspartic Acids*, J. Org. Chem., vol. 26, pp. 1084–1091.

*Primary Examiner*—Duc Truong
*Attorney, Agent, or Firm*—Connolly and Hutz

[57] ABSTRACT

Pigment preparations having a solids content of greater than 40% comprise, as dispersing agents, polymers having recurring succinyl units, in particular polyaspartic acid.

13 Claims, No Drawings

PIGMENT PREPARATIONS HAVING A HIGH SOLIDS CONTENT

The invention relates to pigment preparations having a high solids content.

It is known from the literature and practice that wetting/dispersing agents are employed for the preparation of aqueous pigment suspensions. Examples are phosphates, salts and other derivatives of polyacrylic acids and other polymeric carboxylic acids.

However, all the wetting/dispersing agents known to date and employed according to the prior art have the common feature of an inadequate biological degradability. They therefore require further improvements—depending on the intended use of the pigment suspension—in respect of biological degradability.

The use of wetting/dispersing agents of easy biological degradability is advantageous for applications where recycling of the water used or other materials is of importance, in particular for the preparation of pigment and filler suspensions for production of paper and cardboard, for the preparation of water-dilutable varnishes and paints, for the building materials industry and for the preparation of pigment granules and also of powdery pigment formulations or coating materials.

The development of wetting/dispersing agents which are easily or more easily biologically degradable is therefore an industrially and ecologically appropriate aim.

According to WO 92/15535, polyaspartic acid is said to facilitate the dispersion of a large number of inorganic particles, inter alia also pigments, a pigment concentration range of not more than 2000 ppm being used.

The present invention is based on the object of providing a wetting/dispersing agent of good biological degradability for the preparation of aqueous, highly concentrated pumpable and flowable pigment suspensions and pastes.

The present invention relates to an aqueous pigment preparation comprising at least one pigment and at least one dispersing agent, characterized in that the dispersing agent is a polymer with recurring succinyl units and the solids content of the pigment preparation is at least 40% by weight.

Uses of the pigment preparations according to the invention are, for example, water-dilutable varnishes and paints, and coatings for paper or paperboard.

In a preferred embodiment, the preparation according to the invention comprises at least one modifying agent suitable for the particular intended use. In a particularly preferred embodiment, the weight ratio of the polymer having recurring succinyl units to the modifying agent is between 10:90 and 90:10.

In a preferred embodiment, the preparations comprise at least one of the following pigments: titanium dioxide, iron oxide, chromium oxide, spinel phase and bismuth vanadate pigments. Spinel phase pigments are understood as meaning pigments having the following Color-Index Numbers (CI):

C. I. Pigment Yellow 53, C. I. No. 77788
C. I. Pigment Brown 24, C. I. No. 77310
C. I. Pigment Green 50, C. I. No. 77377
C. I. Pigment Blue 36, C. I. No. 77343
C. I. Pigment Blue 28, C. I. No. 77346
C. I. Pigment Black 22, C. I. No. 77429

Possible bismuth vanadate pigments are pigments having the Color Index Number C. I. Pigment Yellow 184. Surprisingly, it has been found that an inorganic and/or organic after-treatment is advantageous, especially in the cases of titanium dioxide, iron oxide and spinel phase pigments.

There are in principle no limitations in respect of the inorganic and/or organic after-treatment.

Examples of inorganic substances for after-treatment are oxides, hydroxides and hydrous oxides of Al, Si, Zr and Zn, and phosphates, by themselves or in combinations. Examples of organic substances for the after-treatment are silicones, polyalcohols and aminoalcohols. In general, inorganic after-treatment substances are employed in a concentration of not more than 15% in total, and organic after-treatment substances are employed in a concentration of not more than 3% in total.

In a preferred embodiment, the polymers to be used according to the invention contain recurring succinyl units having one of the following structures:

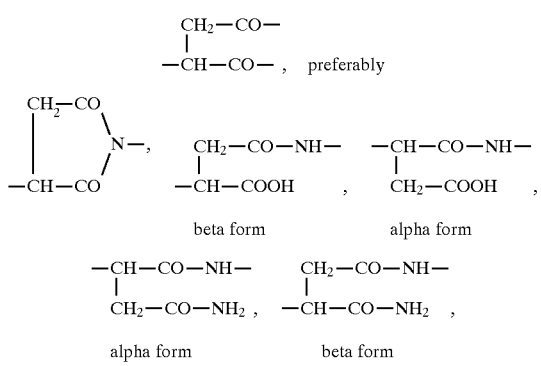

where these structures can also be present as a salt, where appropriate.

α form and β form is to be understood as the peptide linkages obtained by the carboxyl groups in the α- or β-position.

In addition, by a suitable reaction procedure and choice of the educts, the polymers can contain other recurring units, for example a) Malic acid units of the formula

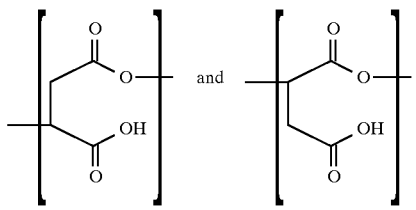

b) Malic acid and fumaric acid units of the formula

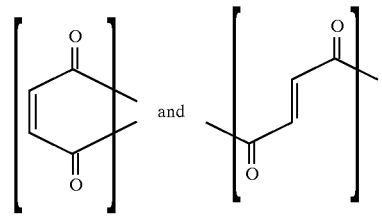

c) Iminodisuccinate units of the formula

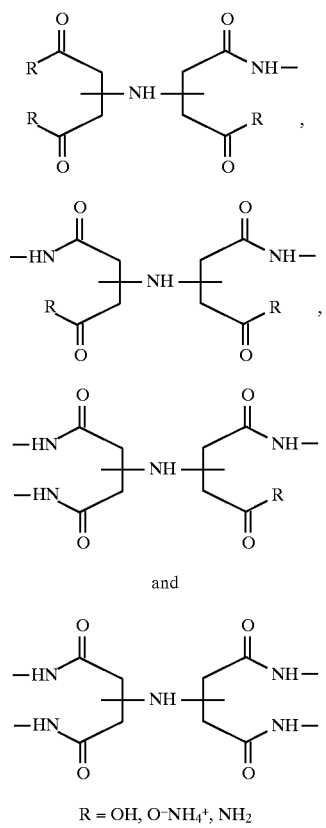

R = OH, O⁻NH₄⁺, NH₂

The chemical preferably analyzed by $^{13}$C-NMR, FT-IR and, after total hydrolysis, by HPLC, GC and GC/MS.

In many preparation processes, the corresponding anhydrides, for example polysuccinimide (PSI) and not the pure acids are initially obtained. Such polymerization products can be converted into a salt by reaction with a base, if appropriate in the presence of water. This conversion is subsequently carried out by hydrolysis in a suitable device. A pH of between 5 and 14 is preferred here. In a particularly preferred form, a pH of 7 to 12 is chosen, in particular by the addition of a base. Suitable bases are alkaline metal and alkaline earth metal hydroxides or carbonates such as, for example, sodium hydroxide solution, potassium hydroxide solution, sodium carbonate or potassium carbonate, ammonia and amines, such as triethylamine, tiethanolamine, diethylamine, diethanolamine, alkylamines and the like.

In addition to the free acids, the Na, K or Ca salts thereof are particularly preferred.

The temperature during the hydrolysis is suitably in a range up to and including the boiling point of the PSI suspension, and is preferably 20° to 150°C. If appropriate, the hydrolysis is carried out under pressure.

However, it is also possible to obtain the free acid, in particular polyaspartic acid, by purely aqueous hydrolysis or treatment of the salt with acids or acid ion exchangers. In the present invention, the term "polyaspartic acid" (=PAA) also includes the salts, unless expressly stated otherwise. The finished product is obtained by drying, preferably spray-drying.

Preferred polymers have a molecular weight according to analyses of gel permeation chromatography, of Mw=500 to 10,000, preferably 700 to 5,000, particularly preferably 1,000 to 4,500. In general, the content of the beta form is more than 50%, preferably more than 70%.

The crude polymers can be freed from monomeric contents by customary working up methods, for example by extraction with water and 1N hydrochloric acid or by membrane filtration.

The preparation of the polymers to be used according to the invention having recurring succinyl units, in particular of α/β-polyaspartic acids and polysuccinimides is known per se, see J. Org. Chem. 26, 1084 (1961), U.S. Pat. No. 4 839 461 (=EP-A 0 256 366), DE-A 2 253 190, U.S. Pat. No. 5 288 783, EP-A 593 187, DE-A 4 221 875, DE-A 4 900 020, DE-A 4 307 114.

Polyaspartic acid and its derivatives can also be employed according to the invention in combination with one component or several components which have proved to be beneficial for the particular intended use. Examples of such other modifying agents are: rheological additives, defoamers, agents for adjusting the pH and, if appropriate, preservatives. In principle, it is also possible to use polyphosphates and polyacrylic acid derivatives and their combinations as well as amines or aminoalcohols as modifying agents, but this is not appropriate because their biological degradability is too low.

The present invention furthermore relates to a process for the preparation of aqueous, highly concentrated, pumpable and flowable pigment preparations, which is characterized in that the polymer having recurring succinyl units which is to be used according to the invention, in particular polyaspartic acid or a derivative thereof, if appropriate in combination with at least one other component, is mixed with water, the pigment is sprinkled into this mixture, while stirring, and the dispersing operation is carried out until the desired fineness and consistency of the suspension are reached.

Another method for preparation of the abovementioned pigment preparations according to the invention comprises first mixing a pigment with this polymer according to the invention in the dry state, a powdery pigment formulation resulting. This can be dispersed in water, if required, the pigment preparation according to the invention being obtained.

A third method according to the invention for the preparation of aqueous, highly concentrated, pumpable and flowable pigment suspensions and pastes comprises adding the polymer according to the invention to an aqueous pigment filter cake and incorporating it, with a suitable unit, for example a dissolver, into the pigment filter cake, whereupon the cake liquefies.

For the preparation of pigment granules the previously prepared pigment suspensions (see above) are passed to a spray dryer.

In practice and according to the prior art, metering is carried out as a function of amounts, based on the pigment or on the total batch. The concentrations are between about 0.1 and 2% by weight (100% pure active substance), based on the pigment.

The required concentrations employed depend, for example, on the wetting/dispersing agent requirement of the pigments, the pH, the water hardness, the required viscosity or the solids content, the temperature and/or the envisaged standing time.

The Na salt of a polyaspartic acid (PAA) having a molecular weight of about 3000, prepared in accordance with EP 0 612 784, is employed in the following examples.

In example 1 to 12 and comparison examples 1 to 12, the activity of polyaspartic acid in the preparation of aqueous pigment pastes having the highest possible solids content was determined.

In example 13 and comparison example 13, the activity of polyaspartic acid in the preparation of aqueous pigment pastes having the highest possible solids content, starting from a powdery mixture of the pigment and the polymer according to the invention, was determined.

EXAMPLE 1

General instructions 20 parts by weight of water were initially introduced into the mixing vessel.

0.1 to a maximum of 2 parts by weight of polyaspartic acid (100% pure) were added, while stirring.

A pH adjustor was added, while stirring, to adjust the pH to 8.5.

100 parts by weight of titanium dioxide A1 (classification according to DIN 55 912, part 1) were sprinkled in, while stirring (dissolver). To ensure a good dispersing action, water was added here until a preparation of high solids content was obtained.

COMPARISON EXAMPLE 1

20 parts by weight of water were initially introduced into the mixing vessel.

A pH adjustor was added, while stirring, to adjust the pH to 8.5.

100 parts by weight of titanium dioxide Al (classification according to DIN 55 912, part 1) were sprinkled in, while stirring (dissolver); to ensure a good dispersing action, water was added here until a preparation of high solids content was obtained.

The pH was then measured, the viscosity determined and the solids content achieved calculated.

The procedure was the same for examples 2 to 12 and comparison examples 2 to 12.

EXAMPLE 13

100 parts by weight of iron oxide red were mixed homogeneously with 0.7 parts by weight of polyaspartic acid (Na salt; 100% pure) in a mixer. This mixture was then sprinkled into 58.0 parts by weight of water, while stirring (dissolver), and dispersed for 10 minutes.

COMPARISON EXAMPLE 13

100 parts by weight of iron oxide red were sprinkled into 58.7 parts by weight of water, while stirring (dissolver), and dispersed for 10 minutes.

In examples 14 and 15 and comparison examples 14 to 17, the influence of polyaspartic acid in the preparation of aqueous, highly concentrated, pumpable and flowable and storage-stable titanium dioxide slurries was determined in comparison with a conventional wetting/dispersing agent.

EXAMPLE 14

72.000% of titanium dioxide R2, classification according to DIN 55 912/1

27.928% of water 0.072% of PAA (100% pure)

pH=8.5

| Comparative examples | |
|---|---|
| 14 | 15 |
| 72.000% | 72.000% titanium oxide R2* |
| 27.928% | 27.720% water |
| 0.072% | 0.280% polyacrylate |
| | pH = 8.5 |

EXAMPLE 15

65.000% of titanium dioxide R3*

31.135% of water 0.065% of PAS (100% pure)

0.100% of rheological additive 3.700% of pH adjustor (pH=8.5)

*Classification according to DIN 55 912, part 1

| Comparison examples | |
|---|---|
| 16 | 17 |
| 65.000% | 65.000% titanium oxide |
| 31.495% | 31.300% water |
| 0.065% | 0.260% of the Na salt of a phosphonobutane tricarboxylic acid |
| 0.100% | 0.100% rheological additive |
| 3.340% | 3.340% pH adjustor |

EXAMPLE 16

(Preparation of pigment granules according to the invention)

Solid polyaspartic acid was added in portions to 11 kg of a filter cake, which comprised 64% by weight of solid in the form of an R1 ** titanium dioxide pigment, in a 25 l plastic drum with a dissolver and the mixture was stirred. After addition of an amount of about 0.4% by weight, based on the $TiO_2$, the filter cake was liquified. An amount of a silicone oil sufficient for hydrophobizing was added to the suspension and the mixture was passed to a spray dryer with nozzle spraying. Free-flowing, low-dust pigment granules suitable for coloring plastics and having an average particle diameter of 0.15 mm were obtained, see Table 3.

**Classification according to DIN 55 912, part 1

COMPARISON EXAMPLE 18

(Preparation of pigment granules with a conventional dispersing agent)

The procedure was as in Example 16. Starting from the same filter cake and the same silicone oil, but liquified with about 0.4% of a polyacrylate instead of the polyaspartic acid, free-flowing, low-dust pigment granules which are suitable for coloring plastics and have an average particle diameter of 0.17 mm were obtained. The properties of these granules are compared with those of the granules from example 16 in Table 3.

TABLE 1

Influence of PAA on the maximum solids content respectively the viscosity of aqueous pigment suspensions

| Example | Pigment | [%] of PAA, based on pigment | Maximum solids concentration | Viscosity in mPa · s, approx. |
|---|---|---|---|---|
| Example 1 | Titanium dioxide A1* | 0.3 | 70.0 | 60000 |
| Comparison example 1 | | 0 | 70.0 | 1500 |
| Example 2 | Titanium dioxide R1* | 0.3 | 71.0 | 45000 |
| Comparison example 2 | | 0 | 71.0 | 40000 |
| Example 3 | Titanium dioxide R3* after treated | 0.3 | 69.0 | 30 |
| Comparison example 3 | | | | |
| — | | 0 | 69.0 | 3200 |
| Example 4 | Iron oxide red C.I. Pigment Red 101 | 0.57 | 57.0 | 16000 |
| Comparison example 4 | | | | |
| — | | 0 | 50.0 | 1200 |
| Example 5 | Iron oxide red after-treated with SiO$_2$ + Al$_2$O$_3$ C.I. Pigment Red 101 | 0.7 | 70.0 | 54000 |
| Comparison example 5 | | | | |
| — | | 0 | 50.0 | 1200 |
| Example 6 | Chromium oxide C.I. Pigment Green 17 | 0.3 | 67.0 | 8000 |
| Comparison example 6 | | | | |
| — | | 0 | 67.0 | 23000 |
| Example 7 | Nickel rutile yellow (Spinel) C.I. Pigment Yellow 53 | 0.3 | 70.0 | 2700 |
| Comparison example 7 | | | | |
| — | | 0 | 70.0 | 30000 |
| Example 8 | Chromium rutile yellow (Spinel) C.I. Pigment Yellow 24 | 0.3 | 61.0 | 4700 |
| Comparison example 8 | | 0 | 61.0 | 30000 |
| Example 9 | Chromium rutile yellow (Spinel) after-treated with SiO$_2$ + Al$_2$O$_3$ C.I. Pigment Yellow 24 | 0.3 | 68.0 | 3700 |
| Comparison example 9 | | | | |
| — | | 0 | 68.0 | 24000 |
| Example 10 | Cobalt green C.I. Pigment Green 50 | 0.3 | 67.0 | 30 |
| Comparison example 10 | | | | |
| — | | 0 | 67.0 | 13000 |
| Example 11 | Cobalt blue C.I. Pigment Blue 36 | 0.3 | 69.0 | 30 |
| Comparison example 11 | | | | |
| — | | 0 | 69.0 | 18000 |
| Example 12 | Bismuth vanadate C.I. Pigment Yellow 184 | 0.3 | 63.0 | 15000 |
| Comparison example 12 | | | | |
| — | | 0 | 63.0 | 13000 |
| Example 13 | Iron oxide after-treated with SiO$_2$ + Al$_2$O$_3$ | 0.7 | 63.0 | 170 |
| Comparison example 13 | | | | |
| — | C.I. Pigment Red 101 | 0 | 63.0 | 7500 |

*Classification according to DIN 55 912, part 1

Table 1 shows that the examples according to the invention show either better example/comparison examples 3, 6–11) or the same results (examples/comparison examples 2, 12) in respect of the viscosities compared with the comparison examples. It is additionally to be taken into account here that the polyaspartic acid used is biologically degradable, in contrast to polyacrylate. The use of polyaspartic acid furthermore allows the solids content in the pigment suspensions to be increased (cf. examples 4 and 5).

Surprisingly, it was found that the use of inorganically and/or organically treated pigments is advantageous (cf. examples 2 [not after-treated] and 3 [after-treated], 4 [not after-treated] and 5 [after-treated]). Correspondingly, PAA even shows an adverse influence with untreated anatase (example/comparison example 1).

The use of powdery polyaspartic acid in a powdery pigment formulation based on an inorganic after-treated iron oxide red pigment is likewise advantageous. Here also, a significantly lower viscosity was determined after the incorporation in water (cf. example/comparison example 13). An increase in the solids content would be possible.

TABLE 2

Influence of the dispersing agent and amount thereof on the viscosity and storage stability of aqueous pigment slurries

|  | Pigment concentration or solids content (% by weight) | Amount of wetting/dispersing agent* (% by weight) | pH | Viscosity (Brookfield) (m · Pas) | Visual evaluation of the storage stability** | |
|---|---|---|---|---|---|---|
| Example 14 | 72 | 0.1 | 8.6 | 80 | 1-2 | ) |
| Comparison Example 14 | 72 | 0.1 | 8.6 | 100 | 5 | ) After 4 ) weeks |
| Comparison Example 15 | 72 | 0.4 | 8.6 | 170 | 4-5 | ) |
| Example 15 | 65 | 0.1 | 8.5 | 220 | 3 | ) |
| Comparison Example 16 | 65 | 0.1 | 8.5 | 270 | 3-4 | ) After 2 ) weeks |
| Comparison Example 17 | 65 | 0.4 | 8.5 | 270 | 3 | ) |

*based on the pigment
**1 = very good
5 = poor

TABLE 3

Properties of the pigment granules

|  | Example 16 | Comparison Example 18 |
|---|---|---|
| Hot/cold roller test in PVC hide ΔL* | 3.3 | 3.6 |
| Accelerated weathering/QUV/10% in plasticized PVC |  |  |
| Initial lightness L* | 97.7 | 96.6 |
| Drop in lightness Δ L after 360 h | −1.0 | −1.1 |
| Total color difference ΔE$_{ab}$ after 360 hours | 3.5 | 3.7 |

Table 2 shows the advantageous use of polyaspartic acid in the preparation of highly concentrated aqueous pigment slurries. While 0.1% of the abovementioned polyaspartic acid was sufficient to obtain a 72% strength pumpable and flowable storage-stable TiO$_2$ pigment R2 slurry, a slurry which was indeed pumpable and flowable but not storage-stable was obtained when a commercially available sodium polyacrylate was used, even in a 4× higher amount of dispersing agent.

0.1% of the abovementioned polyaspartic acid was sufficient to obtain a 65% strength pumpable and flowable TiO$_2$ pigment R3 slurry. However, in this case 0.1% of a rheological additive additionally had to be added to improve the storage stability properties. When a commercially available sodium salt of a phosphonobutane-tricarboxylic acid was used, practically comparably favorable results were achieved.

Table 3 shows that pigment granules prepared with polyaspartic acid largely correspond to or are somewhat better than conventional granules produced with polyacrylate in important use properties. The hot/cold roller test is a measure of the dispersibility; the lowest possible differences in lightness ΔL* between cold (intensive dispersion) and hot rolling (less intensive dispersion) are aimed for here. Comparable to somewhat better data are also determined for polyaspartic acid in the weathering test.

We claim:

1. Aqueous pigment preparation comprising at least one pigment and at least one dispersing agent, characterized in that the dispersing agent is a polymer having recurring succinyl units and the solids content of the pigment preparation is at least 40% by weight.

2. Pigment preparation according to claim 1, characterized in that the solids concentration, based on the total preparation, is 50 to 75% by weight.

3. Pigment preparation according to claim 1, characterized in that at least one titanium dioxide, iron oxide, chromium oxide, spinel phase or bismuth vanadate pigment is present as the pigment.

4. Pigment preparation according to claim 1, characterized in that the pigment is inorganically and/or organically after-treated.

5. Pigment preparation according to claim 1, characterized in that the polymer contains recurring succinyl units having at least one of the following structures

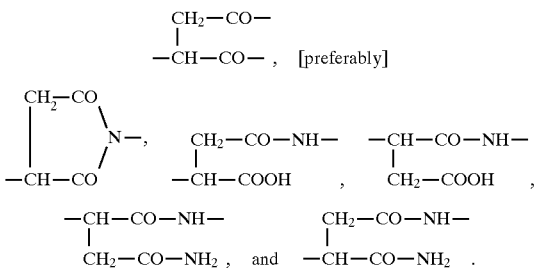

6. Pigment preparation according to claim 1, characterized in that the polymer having recurring succinyl units essentially contains polysuccinimide and/or α- or β-polyaspartic acid units or salts thereof.

7. Pigment preparation according to claim 1, characterized in that the recurring polymer is essentially an (α/β polyaspartic acid, where the content of the β-linked units, based on the sum of α-+β- linked units, is at least 50%.

8. Pigment preparations according to claim 1, characterized in that they comprise at least one rheological additive, defoamer, agent for adjusting the pH or preservative as a modifying agent.

9. Process for the preparation of the highly concentrated pigment preparation according to claim 1, wherein the polymer having recurring succinyl units is mixed with water, the at least one pigment is sprinkled into this mixture, while stirring, and the stirring is continued until the desired fineness and consistency are reached.

10. Process for the preparation of the highly concentrated aqueous pigment preparations of claim 1, characterized in that the polymer having recurring succinyl units is mixed in powder form with the at least one pigment and this mixture is dispersed in water and adjusted to the desired consistency.

11. Process for the preparation of pigment granules, characterized in that a pigment preparation according to claim 1 is subjected to spray-drying.

12. A powdery pigment formulation consisting essentially of at least one pigment and at least one dispersing agent, wherein the dispersing agent is a polymer having recurring succinyl units and the pigment formulation contains from about 0.1 to 0.7% by weight of the at least one dispersing agent, based on the weight of the at least one pigment.

13. Process for the preparation of the powdery pigment formulation of claim 12, wherein the at least one pigment is dry blended with the at least one dispersing agent in powder form.

\* \* \* \* \*